(12) United States Patent
Agrawal et al.

(10) Patent No.: US 12,340,069 B2
(45) Date of Patent: Jun. 24, 2025

(54) SCREENSHOT CAPTURE BASED ON CONTENT TYPE

(71) Applicant: Motorola Mobility LLC, Chicago, IL (US)

(72) Inventors: Amit Kumar Agrawal, Bangalore (IN); Peng Yueh Hsueh, Cupertino, CA (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 18/236,443

(22) Filed: Aug. 22, 2023

(65) Prior Publication Data
US 2023/0393704 A1    Dec. 7, 2023

Related U.S. Application Data

(63) Continuation of application No. 17/498,404, filed on Oct. 11, 2021, now Pat. No. 11,861,141.

(51) Int. Cl.
G06F 3/04842 (2022.01)
G06F 3/0482 (2013.01)
G06F 9/54 (2006.01)
G06F 16/903 (2019.01)
G06T 7/00 (2017.01)

(52) U.S. Cl.
CPC ............ *G06F 3/0482* (2013.01); *G06F 9/543* (2013.01); *G06F 16/90335* (2019.01); *G06T 7/0002* (2013.01); *G06T 2207/30168* (2013.01)

(58) Field of Classification Search
CPC .. G06F 3/0482; G06F 9/543; G06F 16/90335; G06F 3/04842; G06T 7/0002; G06T 2207/30168
See application file for complete search history.

(56) References Cited

U.S. PATENT DOCUMENTS

| | | | |
|---|---|---|---|
| 8,666,961 B1 * | 3/2014 | Qureshi | G06F 16/24 707/769 |
| 8,826,117 B1 * | 9/2014 | Junee | G11B 27/034 715/230 |
| 10,242,226 B2 * | 3/2019 | Yu | G06F 21/6245 |
| 10,904,608 B2 | 1/2021 | Horiguchi | |
| 11,861,141 B2 | 1/2024 | Agrawal et al. | |
| 2006/0277460 A1 | 12/2006 | Forstall et al. | |

(Continued)

OTHER PUBLICATIONS

U.S. Appl. No. 17/498,404, "Non-Final Office Action", U.S. Appl. No. 17/498,404, Jun. 1, 2023, 11 pages.

(Continued)

*Primary Examiner* — Hien L Duong
(74) *Attorney, Agent, or Firm* — FIG. 1 Patents

(57) ABSTRACT

Techniques for screenshot capture based on content type are described and are implementable to enable a screenshot of content displayed on a device to be captured based on a content type for the content. The described implementations, for instance, automatically determine a content type for content displayed on a device and capture a screenshot based on the content type, such as whether the content represents static content or dynamic content. Further, implementations enable a query to be utilized to determine whether to generate one or more of a static screenshot of visual content or a dynamic screenshot of visual content.

20 Claims, 11 Drawing Sheets

(56) References Cited

U.S. PATENT DOCUMENTS

| | | | |
|---|---|---|---|
| 2008/0282160 A1* | 11/2008 | Tonnison | G06F 9/451 715/785 |
| 2008/0307308 A1* | 12/2008 | Sullivan | G06F 16/9577 707/E17.121 |
| 2009/0254631 A1* | 10/2009 | Jain | G06F 16/9562 715/764 |
| 2012/0050318 A1* | 3/2012 | Khasnis | G11B 27/029 345/625 |
| 2013/0080531 A1 | 3/2013 | Yoon et al. | |
| 2013/0258042 A1 | 10/2013 | Shun et al. | |
| 2014/0218385 A1 | 8/2014 | Carmi | |
| 2014/0372865 A1* | 12/2014 | Corob | G06F 40/166 715/234 |
| 2015/0121423 A1* | 4/2015 | Phipps | H04N 21/2665 725/35 |
| 2015/0256740 A1* | 9/2015 | Kalama | H04N 23/64 348/222.1 |
| 2016/0117093 A1 | 4/2016 | Yokoyama et al. | |
| 2016/0246484 A1 | 8/2016 | Kim et al. | |
| 2016/0274771 A1 | 9/2016 | Seong et al. | |
| 2016/0309223 A1 | 10/2016 | Tamari | |
| 2016/0342581 A1 | 11/2016 | Delgado et al. | |
| 2017/0134605 A1* | 5/2017 | Ju | G06F 3/048 |
| 2017/0329859 A1* | 11/2017 | Ploeg | G06F 16/954 |
| 2018/0349485 A1 | 12/2018 | Carlisle et al. | |
| 2019/0147026 A1 | 5/2019 | Jon et al. | |
| 2019/0246165 A1 | 8/2019 | Brouwer et al. | |
| 2019/0377476 A1* | 12/2019 | Wong | G06F 3/0486 |
| 2020/0065576 A1 | 2/2020 | Padmanaban et al. | |
| 2020/0162796 A1 | 5/2020 | Azuolas et al. | |
| 2022/0066990 A1 | 3/2022 | Clingman et al. | |
| 2022/0206677 A1 | 6/2022 | Zadina et al. | |
| 2022/0329686 A1* | 10/2022 | Takura | G06F 3/04817 |
| 2023/0115555 A1 | 4/2023 | Agrawal et al. | |
| 2024/0126424 A1* | 4/2024 | Xu | G06F 3/0482 |

OTHER PUBLICATIONS

U.S. Appl. No. 17/498,404, "Notice of Allowance", U.S. Appl. No. 17/498,404, Jul. 24, 2023, 5 pages.

Simon, Justin , "Screen Capture: The Best Way to Take Screenshots (PC and Mac)", TechSmith [online][retrieved Sep. 8, 2021]. Retrieved from the Internet <https://www.techsmith.com/blog/how-to-capture-screen-images/>, 2017, 13 Pages.

\* cited by examiner

SCREENSHOT CAPTURE BASED ON CONTENT TYPE

RELATED APPLICATION

This application is a continuation of and claims priority to U.S. patent application Ser. No. 17/498,404 filed 11 Oct. 2021 entitled "Screenshot Capture based on Content Type," the disclosure of which is incorporated by reference herein in its entirety

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. In interacting with such devices users often encounter scenarios where they would like to capture an image of content displayed on a device, e.g., a screenshot of the content. Current implementations for capturing screenshots, however, demonstrate a number of drawbacks that result in user frustration and system resource wastage.

BRIEF DESCRIPTION OF THE DRAWINGS

Aspects of screenshot capture based on content type are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
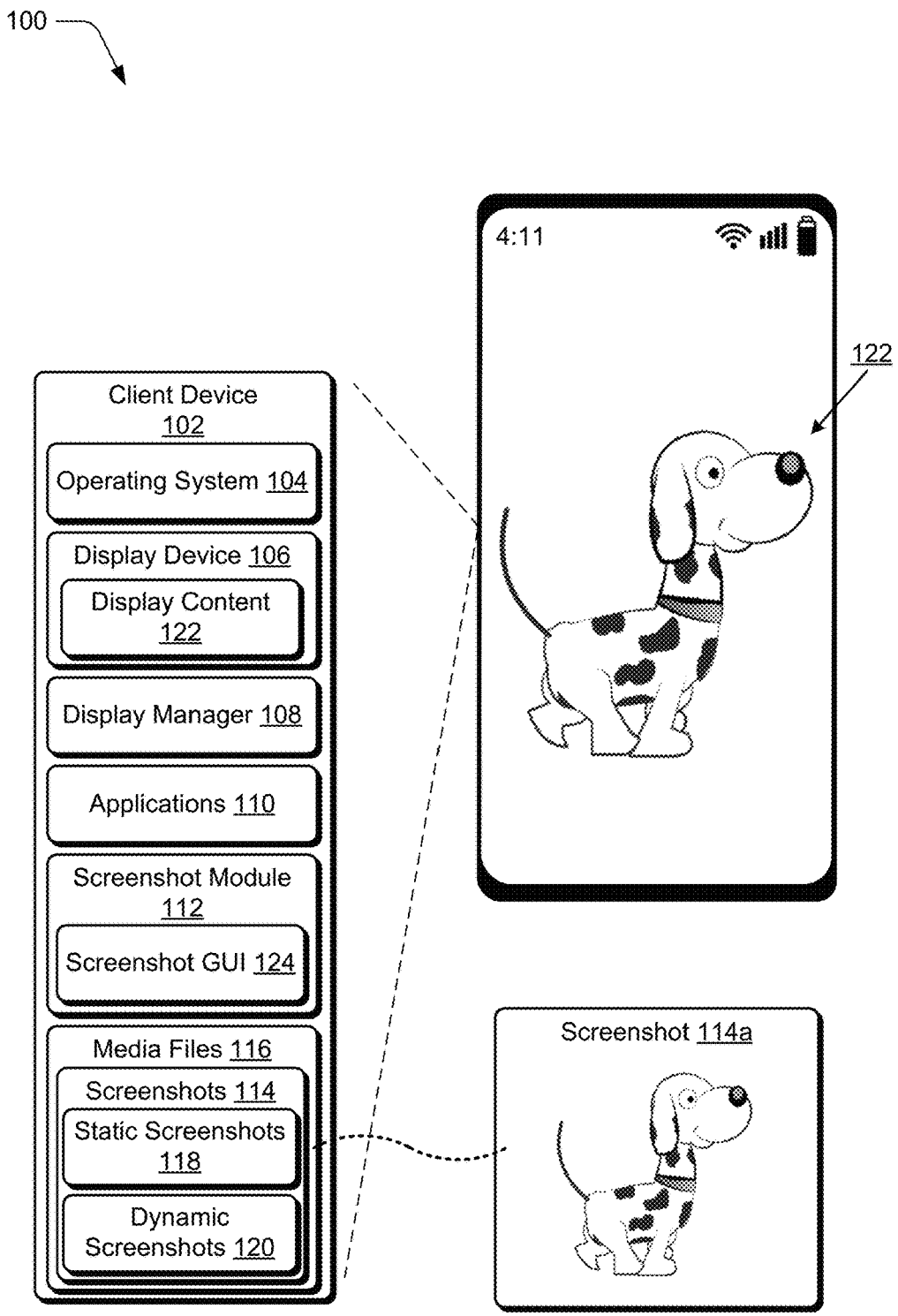
FIG. 1 illustrates an example environment in which aspects of screenshot capture based on content type can be implemented.

Techniques for screenshot capture based on content type are described and are implementable to enable a screenshot of content displayed on a device to be captured based on a content type for the content. Generally, the described implementations automatically determine a content type for content displayed on a device and capture a screenshot based on the content type. This provides for greater automation and user convenience than is provided by traditional techniques for capturing screenshots.

Conventional screenshot techniques typically have difficulty capturing screenshots of dynamic content, e.g., content such as animation and video. Due to complications in activating screenshot functionality in conventional techniques, for example, a user attempting to capture a screenshot of dynamic content will often miss portions of the dynamic content that the user wishes to capture. This causes user frustration and may result in a user abandoning an attempt to capture a screenshot of dynamic content. Alternatively, to capture dynamic content a user may record a video of the dynamic content. Capturing video content, however, is typically memory and storage intensive and results in excess usage of system resources.

Accordingly, in the described techniques, content type for content is automatically determined and utilized to determine how to capture a screenshot of the content. For instance, consider a scenario where a user is viewing content displayed on a device and wishes to capture a screenshot of the content. Accordingly, the user provides input to the device requesting a screenshot capture, such as via touch input (e.g., a specific gesture), pressing a button or set of buttons on the device, voice input, and so forth.

In response to the user request for a screenshot, a content type for the content is determined. For instance, it is determined if the content represents static content or dynamic content. Generally, static content represents content that includes static (e.g., unchanging) visual features, such as a still digital image. Dynamic content represents content with changing visual features, such as an animation and/or a digital video. Generally, content type for content is determinable in various ways, such as by querying a functionality of the device (e.g., a display manager, an application, an operating system, etc.). Alternatively or additionally, content type is determinable by inspecting attributes of content, such as by determining whether the content includes static or dynamic visual features.

Accordingly, utilizing the determined content type, a screenshot of the content is captured. For instance, when content is determined to be static content, a screenshot of the content is captured as a static screenshot. In another example when the content is determined to be dynamic content, a dynamic screenshot of the content is captured. For instance, for dynamic content, multiple candidate screenshots of the content are captured over time, such as to provide different candidate screenshots that depict changing visual attributes of the dynamic content. When the dynamic content represents an animation or a digital video, for example, the candidate screenshots depict changing visual attributes of the animation/digital video over time, such as over n seconds. Thus, the candidate screenshots are aggregateable into a dynamic screenshot, such as a media file that depicts a portion of dynamic content.

In at least one implementation, the described techniques provide functionality for enabling a user to provide guidance for generating a screenshot. For instance, where multiple candidate screenshots of dynamic content are captured, a guidance query is provided that queries a user for whether to generate a static screenshot and/or a dynamic screenshot using the candidate screenshots. In an example implementation where a user indicates to capture a static screenshot, candidate screenshots are presented to the user and the user is able to select an instance and/or instances of the candidate screenshots for generating a static screenshot and/or set of static screenshots. In an example implementation where a user indicates to capture a dynamic screenshot, candidate screenshots are presented to the user and the user is able to select a subset or all of the candidate screenshots for generating a dynamic screenshot. The selected candidate screenshots, for example, are aggregated (e.g., concatenated) into a media file that is presentable to depict changing visual attributes exhibited in the source dynamic content.

Accordingly, the described techniques enable screenshots of content to be captured based on content type without requiring manual interactions to specify content type for content.

While features and concepts of screenshot capture based on content type can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of screenshot capture based on content type can be implemented. The environment 100 includes a client device 102 which can be implemented in various ways and according to various form factors such as a smartphone, tablet device, a laptop computer, a desktop computer, a wearable computing device, and so forth.

The client device 102 includes various functionalities that enable the client device 102 to perform different aspects of screenshot capture based on content type discussed herein, including an operating system 104, a display device 106, a display manager 108, applications 110, and a screenshot module 112. The operating system 104 represents functionality for managing hardware and software resources of the client device 102, such as for invoking and enabling communication between hardware and software resources of the client device 102. The display device 106 represents functionality for outputting visual content via the client device 102 and the display manager 108 represents functionality for controlling the display device 106. The display manager 108, for instance, provides display functionality for different processes of the client device 102. In at least one implementation the display manager 108 includes a display driver for the display device 106.

The applications 110 represent functionality for performing various tasks via the client device 102 such as productivity tasks, gaming, web browsing, social media, and so forth. The screenshot module 112 represents functionality for capturing screenshots 114 of content displayed on the display device 106. A screenshot 114, for instance, represents a digital content file that captures a representation of visual content displayed on the display device 106 and is stored as part of media files 116 of the client device 102. In this particular example the screenshots 114 includes static screenshots 118 and dynamic screenshots 120. The static screenshots 118 represent still digital images captured of content displayed on the display device 106, and the dynamic screenshots 120 represent digital content captured of content displayed on the display device 106 that exhibit changing visual features, e.g., motion of visual objects included in the content. The dynamic screenshots 120, for example, capture portions of animation, video content, and/or other digital content that includes changing visual features.

Further to the environment 100 a user implements functionality of the screenshot module 112 to capture a screenshot 114a of display content 122 displayed on the display device 106. Generally, the display content 122 represents various types of visual content output by the display device 106, such as static content (e.g., still images), dynamic content (e.g., video content, animations, etc.), and so forth. In at least one implementation the display content 122 is generated by a functionality of the computing device (e.g., the applications 110) and/or is received from a remote source, such as a network-based content source. For instance, in conjunction with display of the display content 122 on the display device 106, a user provides input to invoke the screenshot module 112 and capture the screenshot 114a of the display content 122. Generally, the screenshot 114a represents an instance of a static screenshot 118 and/or a dynamic screenshot 120. As further detailed below, for example, the screenshot 114a is captured based on a content type for the display content 122, e.g., whether the display content 122 represents static content or dynamic content. Further, the screenshot module 112 implements and exposes a screenshot graphical user interface (GUI) 124 that is utilized to expose and control various functionality of the screenshot module 112. For instance, the screenshot GUI 124 is presented to enable a user to specify types of screenshots 114 to be captured (e.g., static and dynamic screenshots) as well as to select instances of screenshots 114 for storage as part of the media files 116.

Having discussed an example environment in which the disclosed techniques can be performed, consider now some example scenarios and implementation details for implementing the disclosed techniques.

Figure 2:
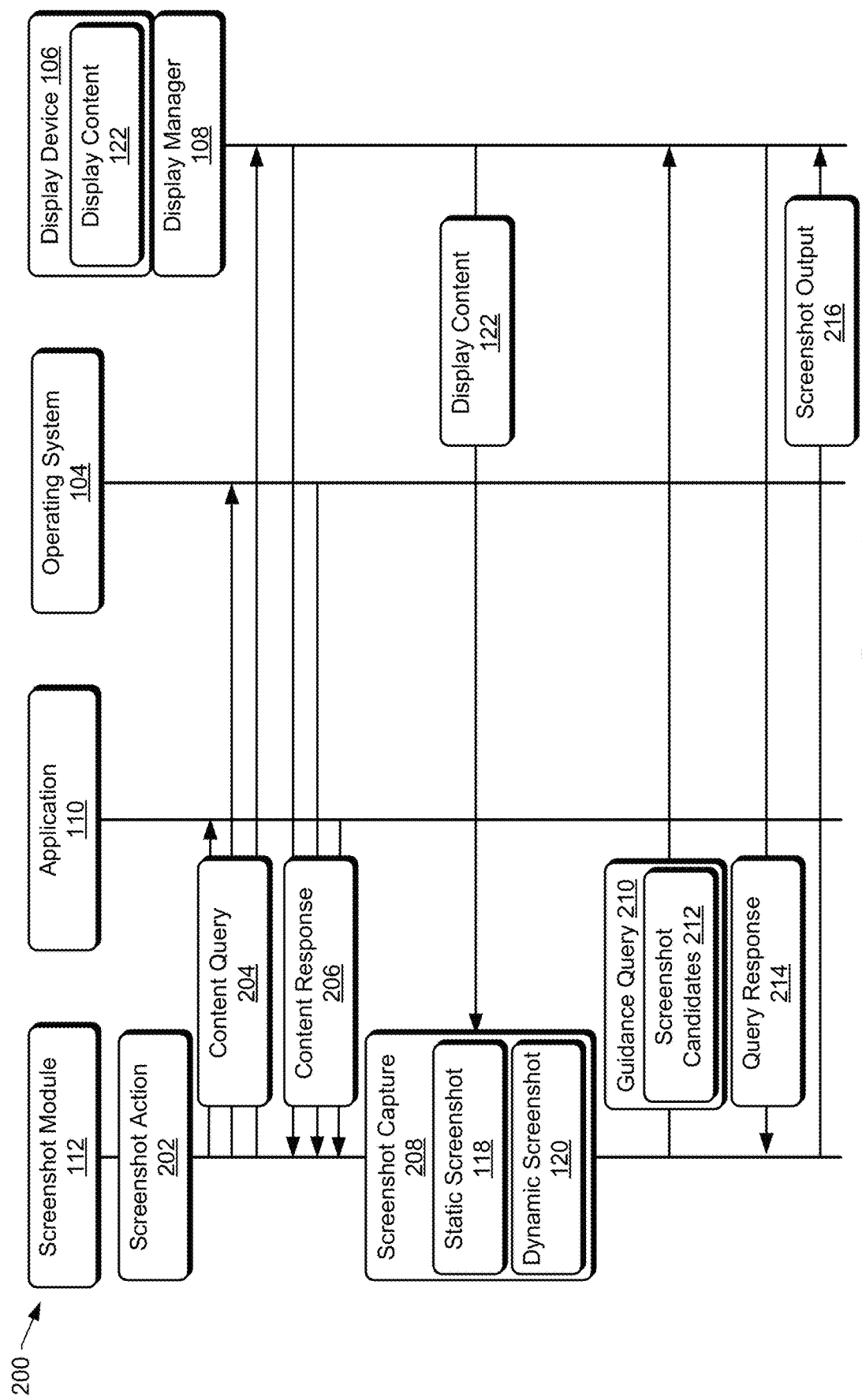
FIG. 2 depicts an example system for implementing aspects of screenshot capture based on content type in accordance with one or more implementations.

FIG. 2 depicts an example system 200 for implementing aspects of screenshot capture based on content type in accordance with one or more implementations. Generally, the system 200 can be implemented in the environment 100 and incorporates attributes of the environment 100 introduced above. In the system 200 the screenshot module 112 receives an indication of a screenshot action 202 to capture a screenshot of display content 122 displayed on the display device 106. A user, for instance, provides input to the client device 102 to request that a screenshot of the display content 122 be captured.

Based on the screenshot action 202 the screenshot module 112 communicates a content query 204 that requests a content type for the display content 122, e.g., whether the display content 122 is static content or dynamic content. The content query 204 can be communicated to a functionality of the client device 102 such as an application 110 (e.g., an application that generates the display content 122), the operating system 104, and/or the display manager 108. Based on the content query 204 the screenshot module 112 receives a content response 206 that identifies a content type for the display content 122. The content response 206, for example, indicates whether the display content 122 is static content or dynamic content. Generally, the content response 206 can be received from a functionality of the client device 102 such as an application 110 (e.g., an application that generates the display content 122), the operating system 104, and/or the display manager 108.

Accordingly, based on a content type identified in the content response 206, the screenshot module 112 performs a screenshot capture 208 of the display content 122. The display manager 108, for example, provides the screenshot module 112 with access to the display content 122 for purposes of the screenshot capture 208. Generally, the screenshot capture 208 includes a static screenshot 118 and/or a dynamic screenshot 120. For instance, in an implementation where the content response 206 identifies the display content 122 as static content, the screenshot capture 208 captures the display content 122 as a static screenshot 118. In an implementation where the content response 206 identifies the display content 122 as dynamic content, the screenshot capture 208 can capture the display content 122 as a dynamic screenshot 120.

In at least one implementation, in conjunction with the screenshot capture 208, the screenshot module 112 generates and outputs a guidance query 210 that prompts a user to provide guidance for capturing a screenshot. For instance, in an implementation where the display content 122 represents dynamic content, the screenshot capture 208 captures candidate screenshots 212 of the display content 122. The candidate screenshots 212, for instance, represent screenshots captured over a period of time. Accordingly, the guidance query 210 queries a user for guidance in determining how to generate a screenshot based on the candidate screenshots 212. For instance, and as detailed below, a static screenshot 118 and/or a dynamic screenshot 120 can be generated via selection of a candidate screenshot 212 and/or a set of candidate screenshots 212.

In an implementation that utilizes the guidance query 210, the screenshot module 112 receives a query response 214 that indicates parameters for capturing a screenshot, such as whether to capture a static screenshot 118 and/or a dynamic screenshot 120. Further, the query response 214 can identify a candidate screenshot 212 and/or set of candidate screenshots 212 to be used to generate a screenshot. Accordingly, based on the screenshot capture 208 (and optionally the query response 214) the screenshot module 112 provides screenshot output 216 that represents an instance of a static screenshot 118 and/or a dynamic screenshot 120.

Figure 3A:
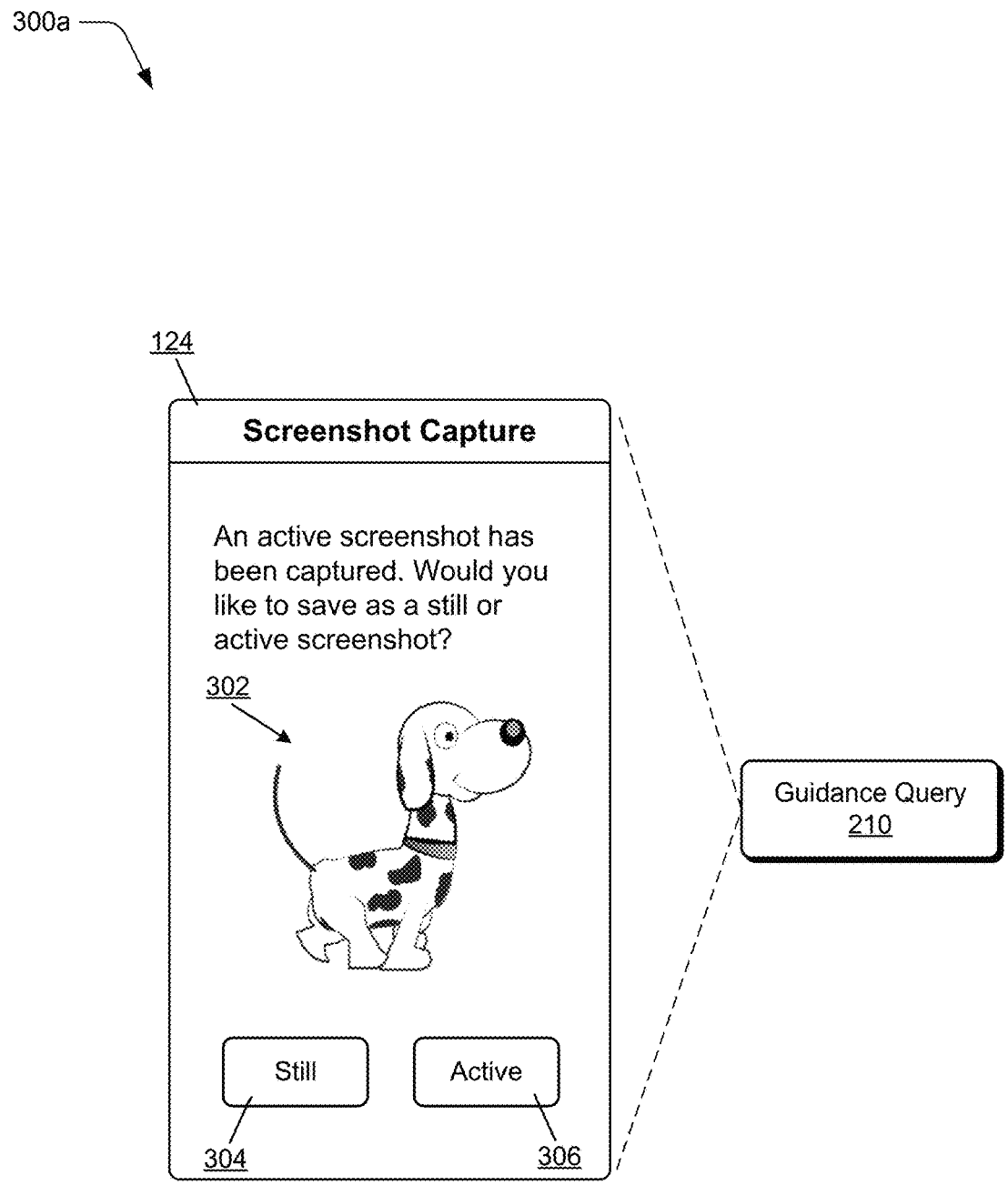
FIG. 3a depicts a scenario for presenting a guidance query in conjunction with capturing a screenshot in accordance with one or more implementations.

FIG. 3a depicts a scenario 300a for presenting a guidance query in conjunction with capturing a screenshot in accordance with one or more implementations. In the scenario 300a the screenshot GUI 124 is output to include an instance of the guidance query 210, such as introduced above with reference to the system 200. The screenshot GUI 124 with the guidance query 210, for example, is output on the display device 106 in conjunction with (e.g., concurrently and/or after) executing the screenshot capture 208.

The guidance query 210 includes a notification that an active screenshot has been captured and queries a user as to whether the user would like to generate a static screenshot (a "still") or a dynamic ("active") screenshot. Further, the guidance query 210 includes a preview 302 of the captured screenshot. Accordingly, to enable a user to specify a type of screenshot to be captured, the guidance query 210 includes a static selectable control 304 and a dynamic selectable control 306. The static selectable control 304 is selectable to enable a static screenshot 118 to be generated from the captured dynamic screenshot and the dynamic selectable control 306 is selectable to enable a dynamic screenshot 120 to be generated from the captured dynamic screenshot.

Figure 3B:
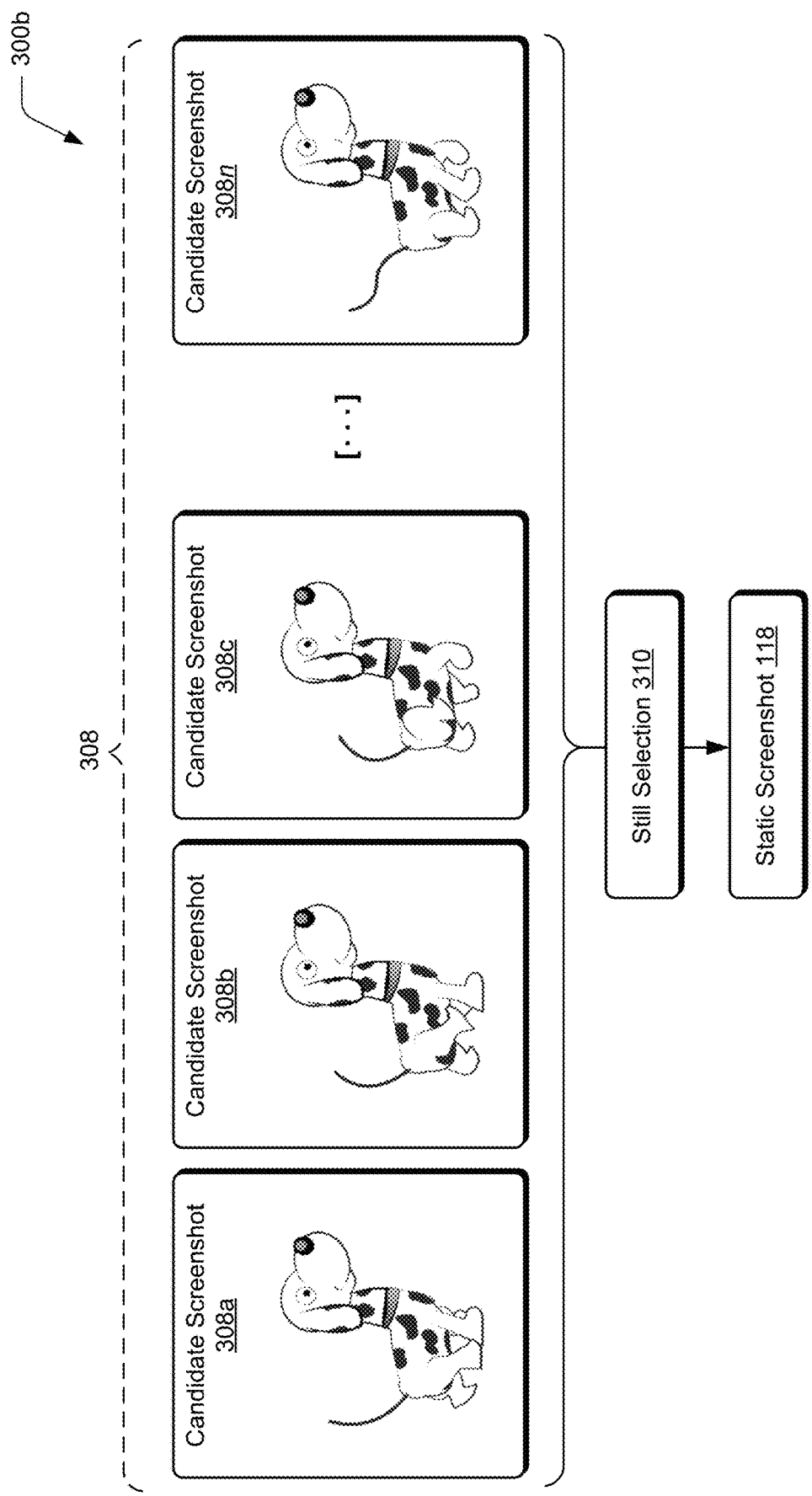
FIG. 3b depicts a scenario for generating a static screenshot in accordance with one or more implementations.

FIG. 3b depicts a scenario 300b for generating a static screenshot in accordance with one or more implementations. The scenario 300b, for instance, represents a continuation of the scenario 300a and is implemented in response to selection of the static selectable control 304. In the scenario 300b multiple candidate screenshots 308 are output including a candidate screenshot 308a, a candidate screenshot 308b, a candidate screenshot 308c, and a candidate screenshot 308n. The candidate screenshots 308, for example, are output as part of the screenshot GUI 124. Accordingly, to generate a static screenshot 118, a user performs a still selection 310 by selecting an instance of the candidate screenshots 308. Based on the still selection 310 the screenshot module 112 generates a static screenshot 118. The static screenshot 118, for instance, represents a still digital image generated from a selected candidate screenshot 308.

Figure 3C:
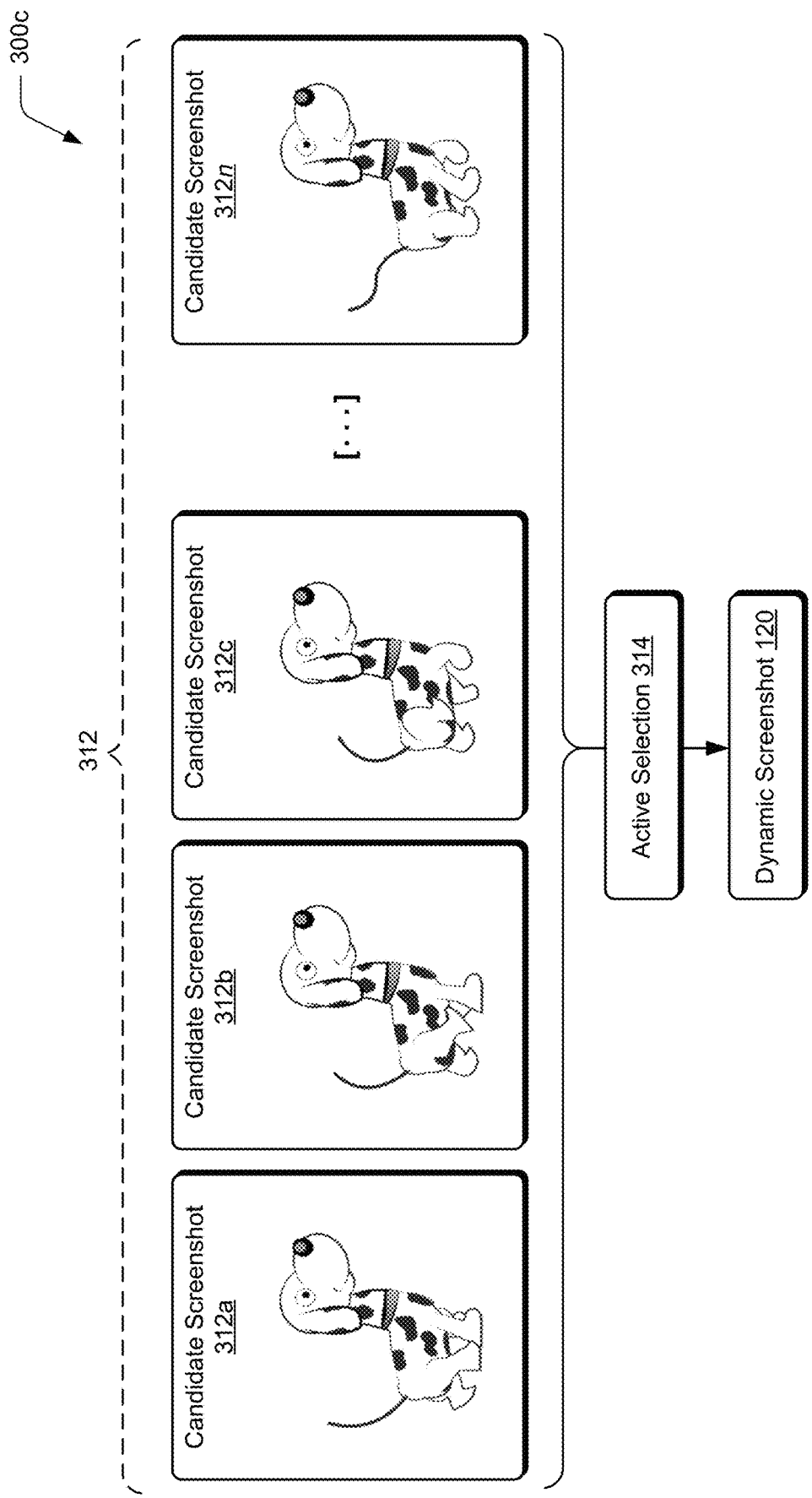
FIG. 3c depicts a scenario for generating a dynamic screenshot in accordance with one or more implementations.

FIG. 3c depicts a scenario 300c for generating a dynamic screenshot in accordance with one or more implementations. The scenario 300c, for instance, represents a continuation of the scenario 300a and is implemented in response to selection of the dynamic selectable control 306. In the scenario 300c multiple candidate screenshots 312 are output including a candidate screenshot 312a, a candidate screenshot 312b, a candidate screenshot 312c, and a candidate screenshot 312n. The candidate screenshots 312, for example, are output as part of the screenshot GUI 124. Accordingly, to generate a dynamic screenshot 120, a user performs an active selection 314 by selecting instances of the candidate screenshots 312. Generally, the user can select all of the candidate screenshots 312 or a subset (less than all) of the candidate screenshots 312. Based on the active selection 314 the screenshot module 112 generates a dynamic screenshot 120. The dynamic screenshot 120, for instance, represents multiple of the candidate screenshots 312 selected by a user. In at least one implementation the screenshot module 112 generates the dynamic screenshot 120 by aggregating the selected candidate screenshots 312 into a media file 116 that can be output to present the selected candidate screenshots 312 with visual motion, such as a Graphics Interchange Format (GIF) file.

Figure 4:
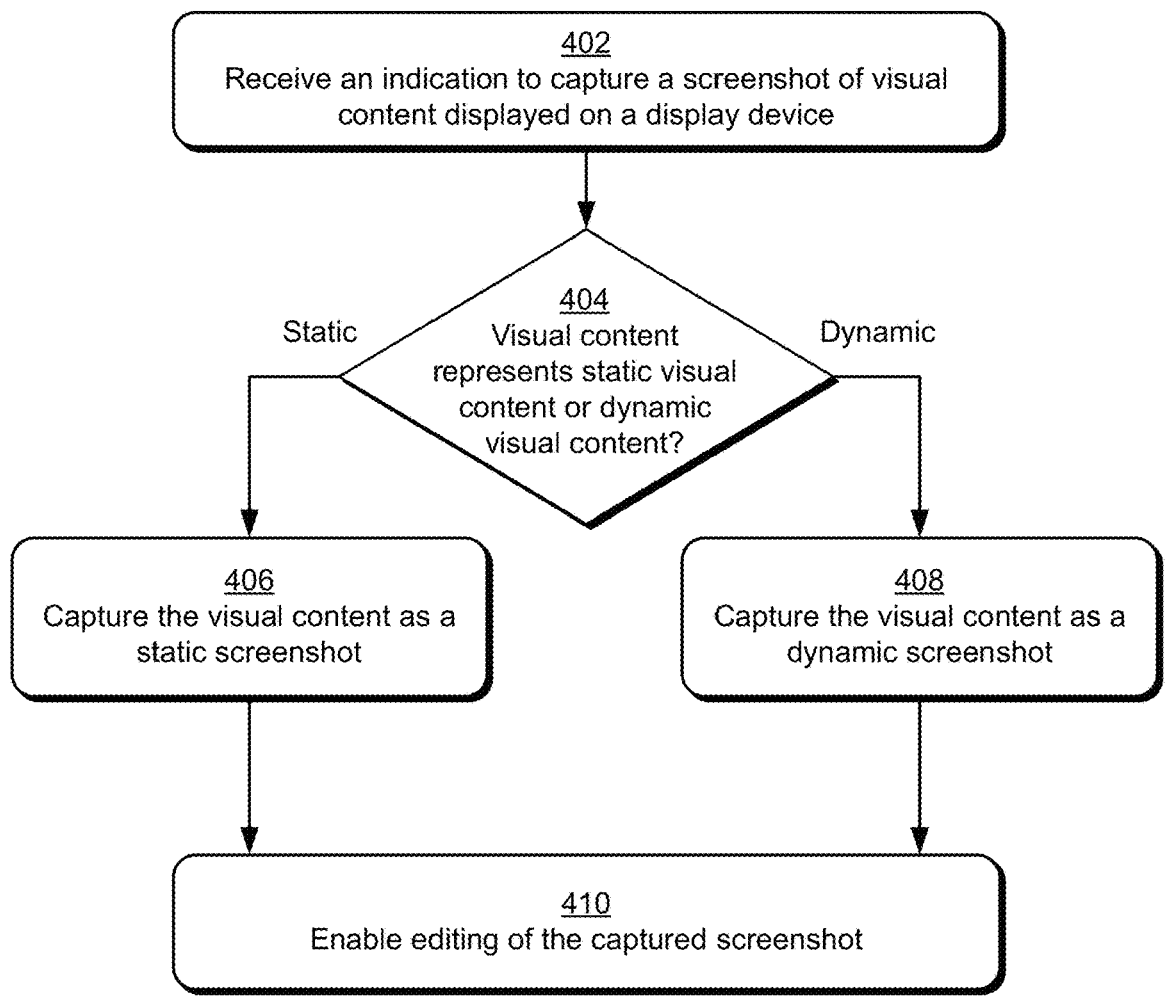
FIG. 4 illustrates a flow chart depicting an example method for capturing a screenshot based on content type in accordance with one or more implementations.

FIG. 4 illustrates a flow chart depicting an example method 400 for capturing a screenshot based on content type in accordance with one or more implementations. At 402 an indication is received to capture a screenshot of visual content displayed on a display device. A user, for instance, provides input to the client device 102 requesting that a screenshot be captured of content displayed on the display device 106. Generally, different types and forms of input can be utilized to request a screenshot, such as touch input to the display device 106 (e.g., a predetermined screenshot gesture), selecting one or more buttons of the client device 102, voice input, and so forth.

At 404 it is determined whether the visual content represents static visual content or dynamic visual content. The screenshot module 112, for example, determines whether content being displayed on the display device 106 represents static visual content (e.g., a still image) or dynamic visual content, such as a video, an animation, and/or other visual content that exhibits changing visual attributes over time. Generally, determining whether visual content is static content or dynamic content can be performed in various ways. For instance, the screenshot module 112 can query a functionality of the client device for a content type, such as the display manager 108, the operating system 104, an application 110, and so forth. Accordingly, the queried functionality can respond with a content type for the visual content. Alternatively a functionality of the client device 102 can proactively notify the screenshot module 112 of a content type, e.g., independent of a query from the screenshot module 112.

In an alternative or additional implementation the screenshot module 112 captures multiple candidate screenshots of visual content and compares the candidate screenshots to determine whether the candidate screenshots include static visual features and thus represent static visual content, or whether the candidate screenshots exhibit changing visual features and thus represent dynamic visual content.

In an event that the visual content represents static visual content, at 406 the visual content is captured as a static screenshot. The screenshot module 112, for example, captures a screenshot of the visual content as a still image. In an event that the visual content represents dynamic visual content, at 408 the visual content is captured as a dynamic screenshot. For instance, the screenshot module 112 captures the visual content as visual content that exhibits changing visual features, e.g., an animation file. At 410 editing of the captured screenshot is enabled. For instance, the screenshot module 112 and/or other functionality of the client device 102 presents an editing experience that enables a user to edit the captured screenshot, such as to edit visual attributes of the captured screenshot. In an implementation where a dynamic screenshot is captured, the editing experience can enable a user to edit a playback length of the dynamic screenshot.

Figure 5:
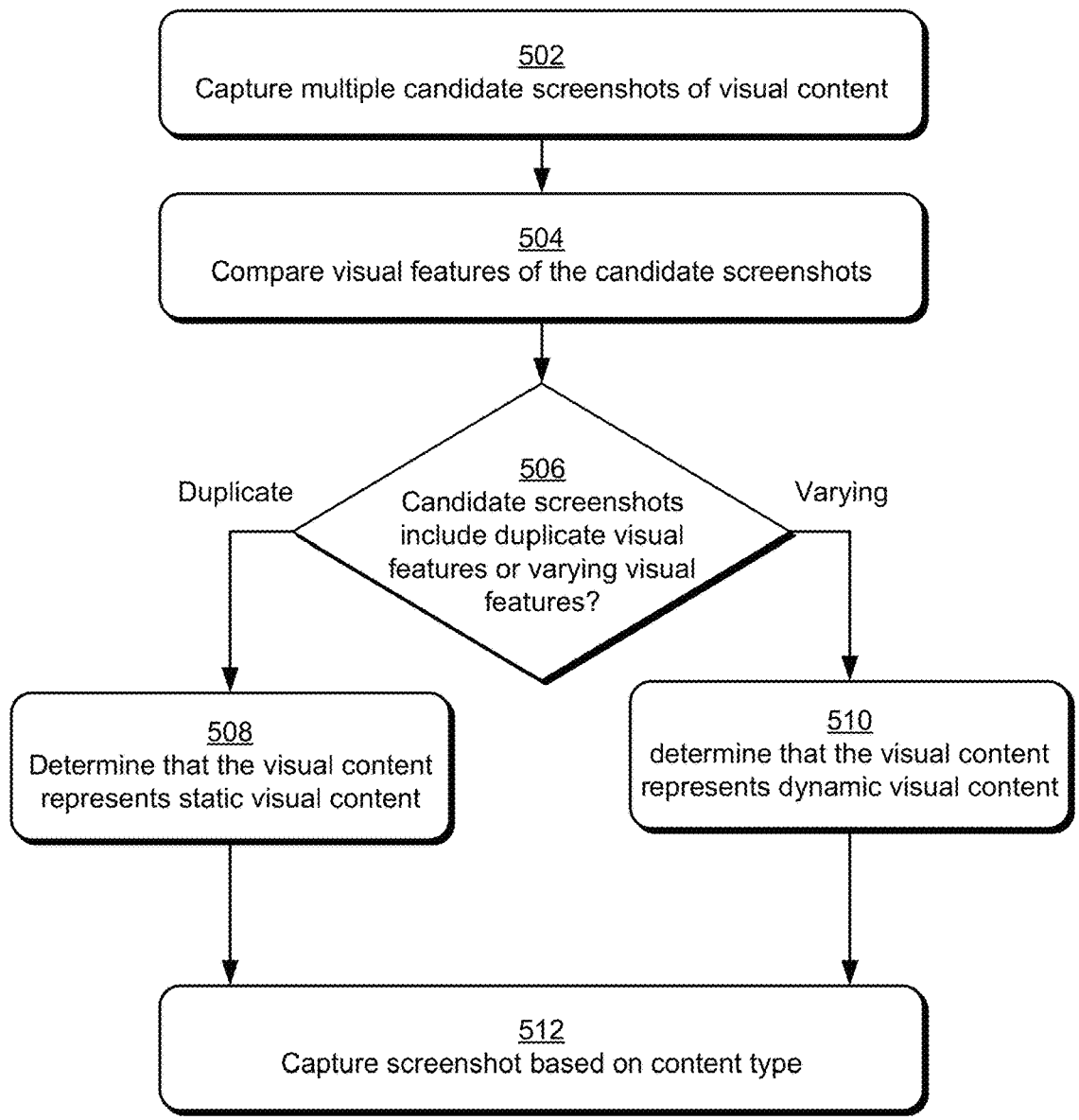
FIG. 5 illustrates a flow chart depicting an example method for capturing a screenshot utilizing candidate screenshots in accordance with one or more implementations.

FIG. 5 illustrates a flow chart depicting an example method 500 for capturing a screenshot utilizing candidate screenshots in accordance with one or more implementations. The method 500, for instance, is performed in conjunction with the method 400, such as to determine whether to capture a screenshot as a static screenshot or a dynamic screenshot. At 502 candidate screenshots of visual content are captured. For instance, in response to user input requesting that a screenshot be captured, the screenshot module 112 captures multiple candidate screenshots of visual content displayed on the display device 106. In at least one implementation the multiple candidate screenshots are captured over a specified period of time, e.g., t seconds. The specified period t can be defined by a system setting of the screenshot module 112 and/or can be user customized, such as based on user configuration of settings of the screenshot module 112.

For instance, in response to user input requesting a screenshot, the screenshot module 112 captures a candidate screenshot at intervals of i and for the period of time t. Generally, i is definable in various ways, such as time divisions of t, as groups of frames based on a frame rate of the display device 106, etc. In at least one implementation the candidate screenshots include screenshots of visual content that is output prior to receiving a request to capture a screenshot. The display manager 108, for instance, buffers display content 122 such that display content that is output prior to a request to capture a screenshot (e.g., prior to the screenshot action 202) is available in a buffer and can be used to generate candidate screenshots.

At 504 visual features of the candidate screenshots are compared. The screenshot module 112, for example, compares visual features of each of the candidate screenshots to one another. Generally, different visual features are comparable such as visual objects included in the candidate screenshots, color features of the candidate screenshots (e.g., colors, brightness, contrast, etc.), image aspect ratio of visual features included in the candidate screenshots, and so forth.

At 506 it is determined based on comparing the visual features whether the candidate screenshots include duplicate visual features or varying visual features. The screenshot module 112, for example, determines whether the candidate screenshots include the same visual features or varying visual features. For instance, if each candidate screenshot includes the same (e.g., unchanging) visual features the candidate screenshots are determined to include duplicate visual features. If some of the candidate screenshots include differing (e.g., changing) visual features the candidate screenshots are determined to including varying visual features. For example, in an implementation where the candidate screenshots capture motion of a visual object from visual content, position and/or orientation of the visual object will vary among at least some of the candidate screenshots.

In an event that the candidate screenshots include duplicate visual features, at 508 it is determined that the visual content represents static visual content. The screenshot module 112, for example, determines that the candidate screenshots include duplicate visual features and thus that the visual content represents static visual content. In an event that the candidate screenshots include varying visual features, at 510 it is determined that the visual content represents dynamic visual content. The screenshot module 112, for example, determines that the candidate screenshots include varying visual features and thus that the visual content represents dynamic visual content. At 512 a screenshot is captured based on the determined content type. For instance, when the visual content is determined to be static content, a static screenshot is captured and when the visual content is determined to be dynamic content, a dynamic screenshot is captured.

Figure 6:
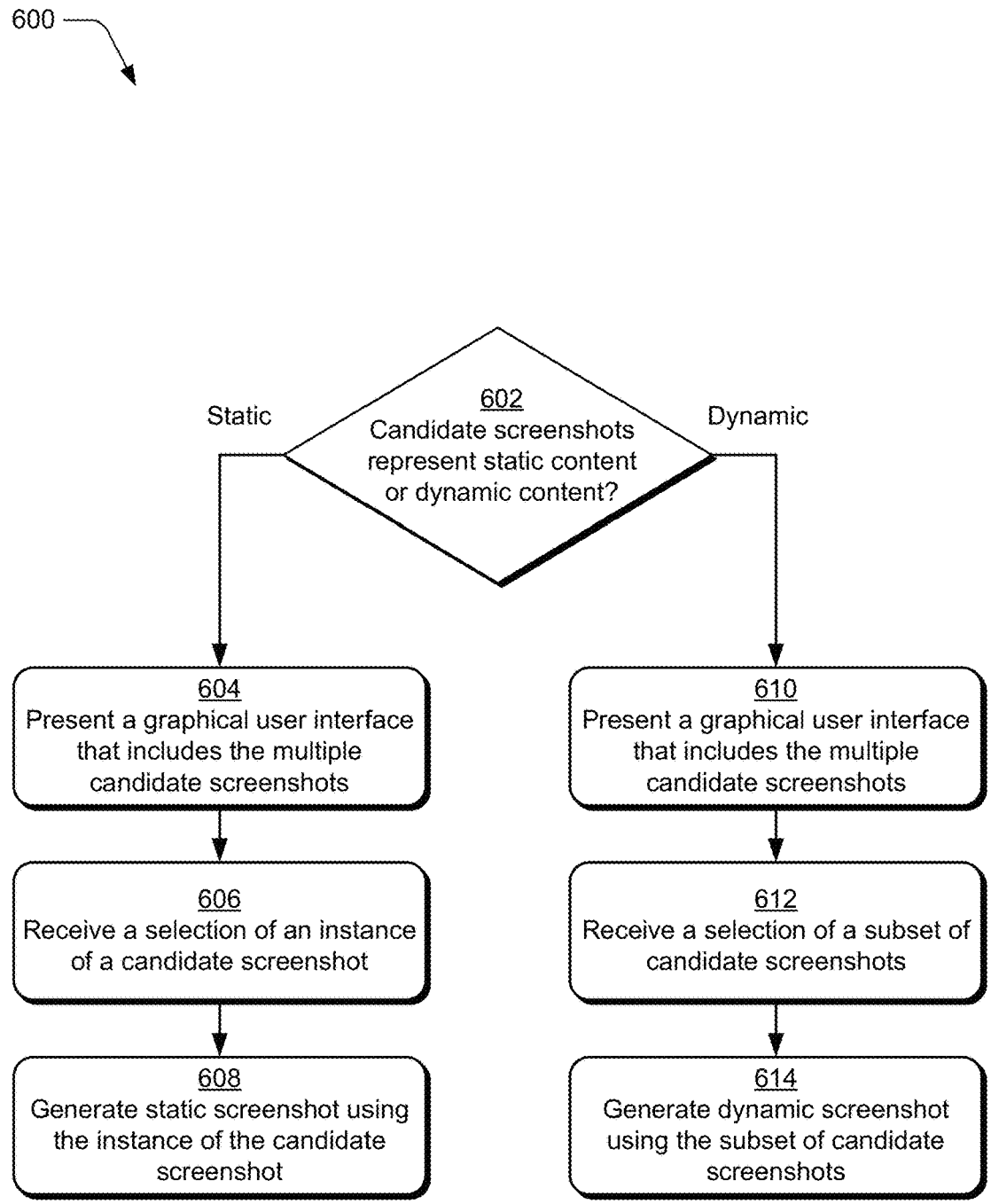
FIG. 6 illustrates a flow chart depicting an example method for enabling user input for capturing a screenshot utilizing candidate screenshots in accordance with one or more implementations.

FIG. 6 illustrates a flow chart depicting an example method 600 for enabling user input for capturing a screenshot utilizing candidate screenshots in accordance with one or more implementations. The method 600, for instance, is performed in conjunction with the method 400 and/or the method 500. At 602 it is determined whether candidate screenshots represent static content or dynamic content. The screenshot module 112, for example, captures candidate screenshots of visual content and determines whether the candidate screenshots include static visual content or dynamic visual content, such as described above.

In an event that the candidate screenshots represent static content ("Static"), at 604 a graphical user interface is presented that includes the candidate screenshots. For instance, the screenshot module 112 presents the screenshot GUI 124 including the candidate screenshots. At 606 a selection of an instance of a candidate screenshot is received. A user, for instance, provides input the screenshot GUI 124 to select a particular candidate screenshot. At 608 a static screenshot is generated using the instance of the candidate screenshot. The screenshot module 112, for example, generates a static screenshot 118 using the selected candidate screenshot. In at least one implementation a user is able to select multiple candidate screenshots and each selected candidate screenshot is utilized to generate an instance of a static screenshot 118.

In an event that the candidate screenshots represent dynamic content ("Dynamic"), at 610 a graphical user interface is presented that includes the candidate screenshots. For instance, the screenshot module 112 presents the screenshot GUI 124 including the candidate screenshots. At 612 a selection of a subset of candidate screenshots is received. A user, for instance, provides input the screenshot GUI 124 to select a group of candidate screenshots. At 614 a dynamic screenshot is generated using the subset of candidate screenshots. The screenshot module 112, for example, generates a dynamic screenshot 120 using the selected candidate screenshots. In at least one implementation the screenshot module 112 concatenates the subset of candidate screenshots to generate the dynamic screenshot, such as in the form of a GIF file and/or other media file that exhibits motion and/or other dynamic visual features when output.

Figure 7:
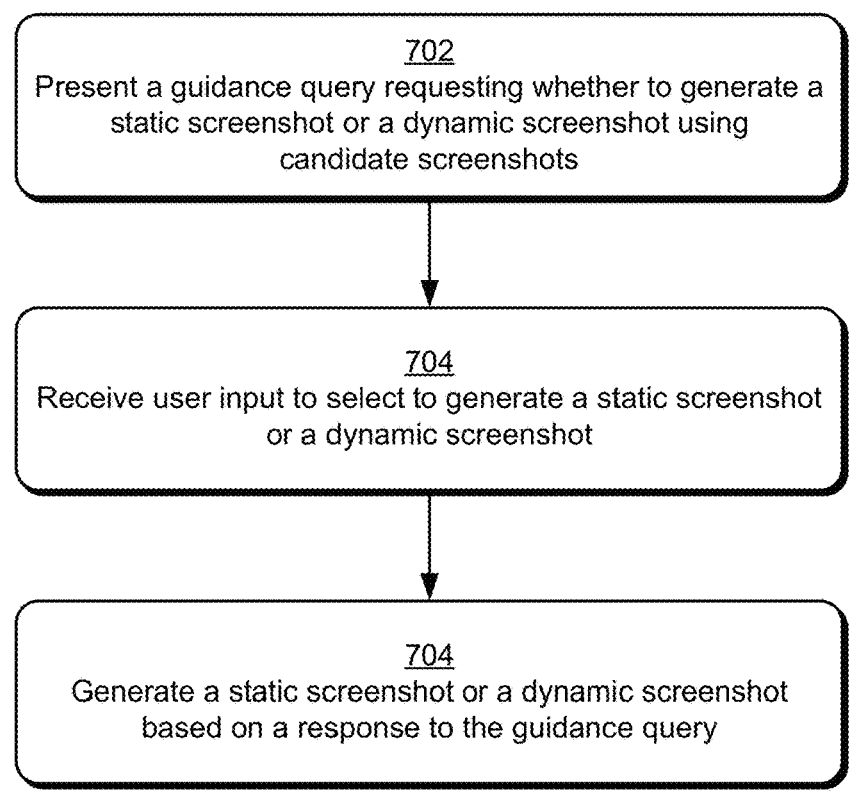
FIG. 7 illustrates a flow chart depicting an example method for enabling user input for selecting a screenshot type in accordance with one or more implementations.

FIG. 7 illustrates a flow chart depicting an example method 700 for enabling user input for selecting a screenshot type in accordance with one or more implementations. The method 700, for instance, is performed in conjunction with the methods 400-600. At 702 a guidance query is presented requesting whether to generate a static screenshot or a dynamic screenshot using candidate screenshots. The screenshot module 112, for example, captures candidate screenshots of dynamic visual content and presents the guidance query 210 to enable a user to specify whether to generate a static screenshot or a dynamic screenshot using the candidate screenshots.

At 704 user input is received to select to generate a static screenshot or a dynamic screenshot. The screenshot module 112, for example, detects that a user provides input to the guidance query 210 to select either a static screenshot option or a dynamic screenshot option. At 706 a static screenshot or a dynamic screenshot is generated based on a response to the guidance query. For instance, the screenshot module 112 generates a static screenshot or a dynamic screenshot based on whether a static screenshot option or a dynamic screenshot option is selected. As detailed throughout, a static screenshot can be generated via selection of an instance of a candidate screenshot and a dynamic screenshot can be generated using multiple candidate screenshots, such as a subset of candidate screenshots selected by a user.

Figure 8:
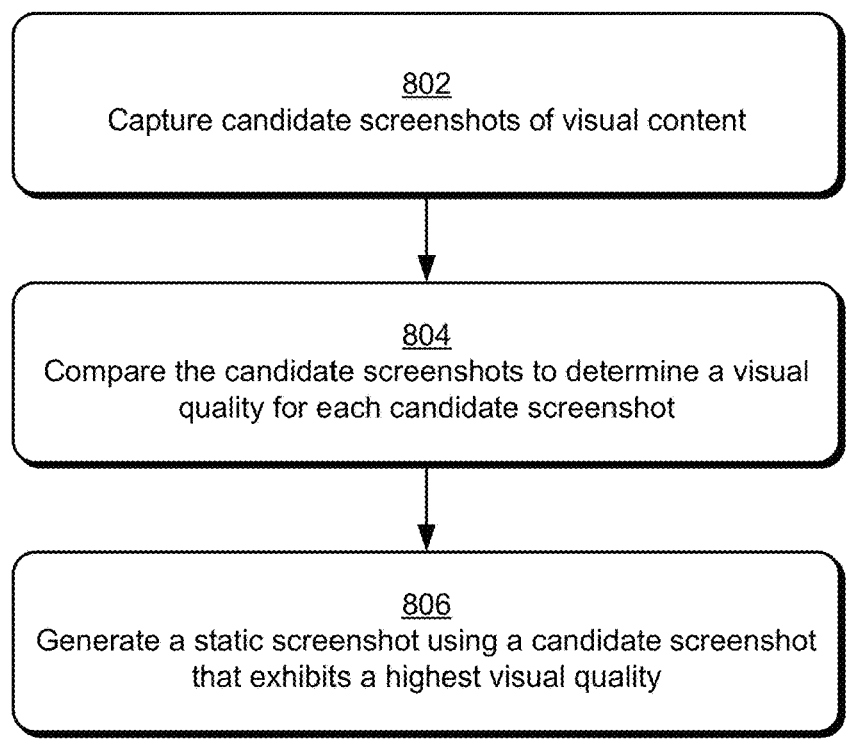
FIG. 8 illustrates a flow chart depicting an example method for enabling automated selection of a screenshot in accordance with one or more implementations.

FIG. 8 illustrates a flow chart depicting an example method 800 for enabling automated selection of a screenshot in accordance with one or more implementations. The method 800, for instance, is performed in conjunction with the methods 400-700. At 802 candidate screenshots of visual content are captured. As described above, for example, the screenshot module 112 captures candidate screenshots of visual content, such as static visual content and/or dynamic visual content.

At 804 the candidate screenshots are compared to determine a visual quality for each candidate screenshot of the candidate screenshots. For instance, the screenshot module 112 implements an image quality algorithm and/or set of algorithms to determine image quality for each of the candidate screenshots. Generally, determining image quality considers various image quality parameters, such as image focus (e.g., blurriness), color contrast, image luminance, visual object positioning (e.g., centering), and so forth. In example implementations where candidate screenshots include an image of a human, image quality parameters include human appearance attributes such as eye position (e.g., whether human eyes are open or closed), smile detection, eye gaze direction, and so forth.

In at least one implementation, for each candidate screenshot, an image quality score is generated by assigning values for a set of image quality parameters for the candidate screenshot. For instance, a machine learning algorithm is trained using a training set of images to process input digital images and generate quality scores for the input digital images. Thus, a set of candidate screenshots can be input to the machine learning algorithm and the machine learning algorithm can output a quality score for each candidate screenshot.

At 806 a static screenshot is generated using a candidate screenshot that exhibits a highest visual quality of the candidate screenshots. For instance, in a scenario where a quality score is generated for each candidate screenshot, a candidate screenshot with a highest quality score is selected and used to generate a static screenshot. Alternatively or additionally a subset of candidate screenshots with the highest quality scores are output and a user selects a preferred candidate screenshot and/or set of candidate screenshots from the subset for generating a static screenshot and/or set of static screenshots.

Accordingly, the described implementations provide automated techniques for capturing screenshots based on content type and that overcome deficiencies experienced in conventional techniques, such as the inability to accurately capture screenshots of dynamic content.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 9:
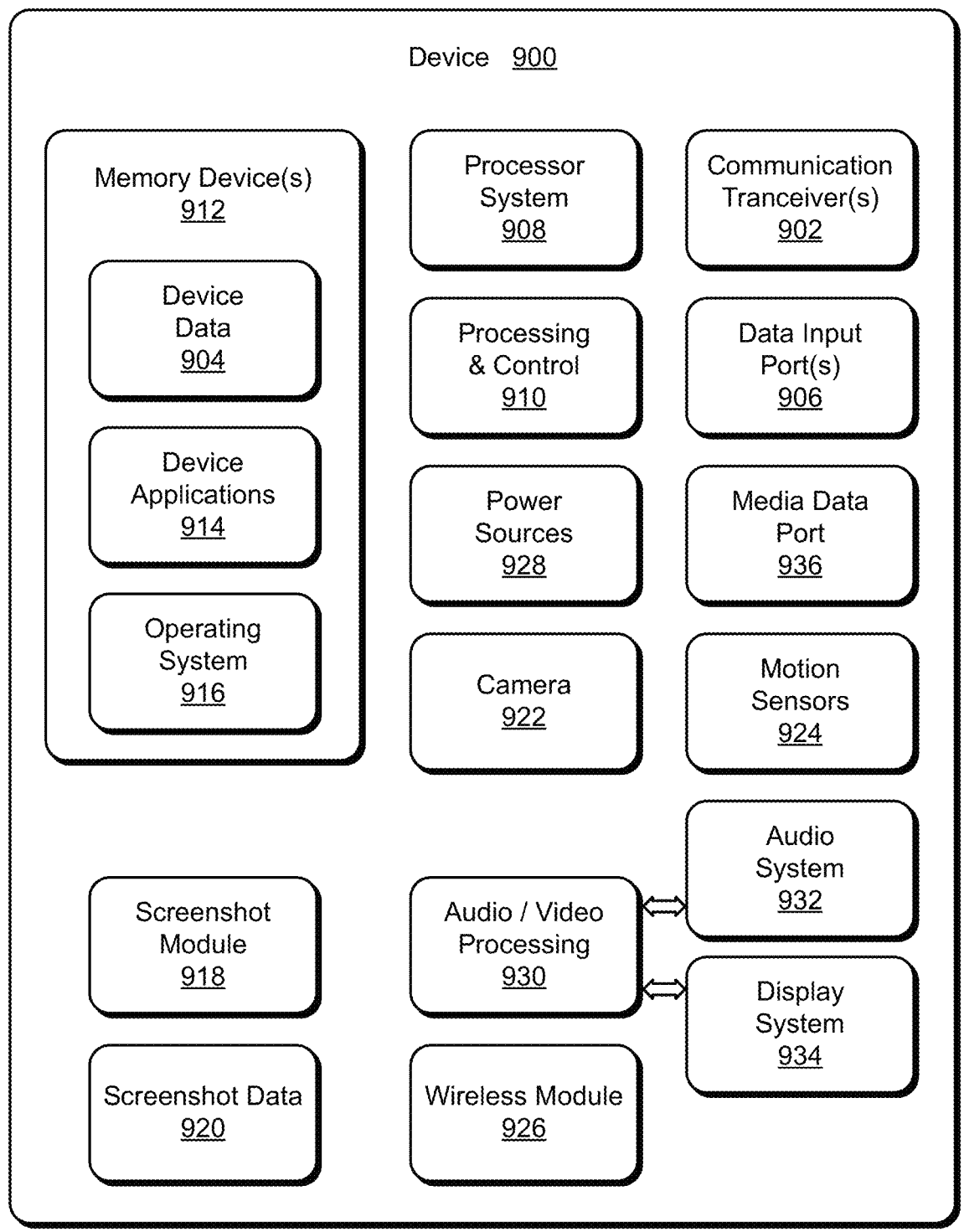
FIG. 9 illustrates various components of an example device in which aspects of screenshot capture based on content type can be implemented.

FIG. 9 illustrates various components of an example device 900 in which aspects of screenshot capture based on content type can be implemented. The example device 900 can be implemented as any of the devices described with reference to the previous FIGS. 1-8, such as any type of mobile device, mobile phone, mobile device, wearable device, tablet, computing, communication, entertainment, gaming, media playback, and/or other type of electronic device. For example, the client device 102 as shown and described with reference to FIGS. 1-8 may be implemented as the example device 900.

The device 900 includes communication transceivers 902 that enable wired and/or wireless communication of device data 904 with other devices. The device data 904 can include any of device identifying data, device location data, wireless connectivity data, and wireless protocol data. Additionally, the device data 904 can include any type of audio, video, and/or image data. Example communication transceivers 902 include wireless personal area network (WPAN) radios compliant with various IEEE 802.15 (Bluetooth™) standards, wireless local area network (WLAN) radios compliant with any of the various IEEE 802.11 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 900 may also include one or more data input ports 906 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus can include any one or combination of different bus structures and architectures, as well as control and data lines.

The device 900 also includes computer-readable storage memory 912 (e.g., memory devices) that enable data storage, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 can be maintained as software instructions with a memory device and executed by the processing system 908. The device applications may also include a device manager, such as any form of a control application, software application, signal-processing and control module, code that is native to a particular device, a hardware abstraction layer for a particular device, and so on. Computer-readable storage memory 912 represents media and/or devices that enable persistent and/or non-transitory storage of information in contrast to mere signal transmission, carrier waves, or signals per se. Computer-readable storage memory 912 do not include signals per se or transitory signals.

In this example, the device 900 includes a screenshot module 918 that implements aspects of screenshot capture based on content type and may be implemented with hardware components and/or in software as one of the device applications 914. For example, the screenshot module 918 can be implemented as the screenshot module 112 described in detail above. In implementations, the screenshot module 918 may include independent processing, memory, and logic components as a computing and/or electronic device integrated with the device 900. The device 900 also includes screenshot data 920 for implementing aspects of screenshot capture based on content type and may include data from the screenshot module 918, such as instances of captured screenshots.

In this example, the example device 900 also includes a camera 922 and motion sensors 924, such as may be implemented in an inertial measurement unit (IMU). The motion sensors 924 can be implemented with various sensors, such as a gyroscope, an accelerometer, and/or other types of motion sensors to sense motion of the device. The various motion sensors 924 may also be implemented as components of an inertial measurement unit in the device.

The device 900 also includes a wireless module 926, which is representative of functionality to perform various wireless communication tasks. For instance, for the client device 102, the wireless module 926 can be leveraged to scan for and detect wireless networks, as well as negotiate wireless connectivity to wireless networks for the client device 102. The device 900 can also include one or more power sources 928, such as when the device is implemented as a mobile device. The power sources 928 may include a charging and/or power system, and can be implemented as a flexible strip battery, a rechargeable battery, a charged super-capacitor, and/or any other type of active or passive power source.

The device 900 also includes an audio and/or video processing system 930 that generates audio data for an audio system 932 and/or generates display data for a display system 934. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 936. In implementations, the audio system and/or the display system are integrated components of the example device. Alternatively, the audio system and/or the display system are external, peripheral components to the example device.

Although implementations of screenshot capture based on content type have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device including: one or more display devices;

and one or more modules implemented at least in part in hardware of the computing device to: receive an indication to capture a screenshot of visual content displayed on the one or more display devices; determine whether the visual content represents static visual content or dynamic visual content; capture the visual content as a static screenshot in an event that the visual content represents static visual content; and capture the visual content as a dynamic screenshot in an event that the visual content represents dynamic visual content.

In some aspects, the techniques described herein relate to a computing device, wherein to determine whether the visual content represents static visual content or dynamic visual content includes to communicate a query to a functionality of the computing device and receive a query response identifying whether the visual content represents static visual content or dynamic visual content.

In some aspects, the techniques described herein relate to a computing device, wherein functionality of the computing device includes one or more of a display manager, an operating system, or an application.

In some aspects, the techniques described herein relate to a computing device, wherein to determine whether the visual content represents static visual content or dynamic visual content includes to: capture multiple candidate screenshots of the visual content; compare the multiple candidate screenshots to determine whether the multiple candidate screenshots include duplicate visual content or varying visual content; determine that the visual content represents static visual content in an event that the multiple candidate screenshots include duplicate visual content; and determine that the visual content represents dynamic visual content in an event that the multiple candidate screenshots include varying visual content.

In some aspects, the techniques described herein relate to a computing device, wherein to capture the visual content as a static screenshot includes to: capture multiple candidate screenshots of the visual content; present a graphical user interface that includes the multiple candidate screenshots; receive a selection of an instance of a candidate screenshot from the multiple candidate screenshots; and generate the static screenshot using the instance of the candidate screenshot.

In some aspects, the techniques described herein relate to a computing device, wherein to capture the visual content as a static screenshot includes to: capture multiple candidate screenshots of the visual content; compare the multiple candidate screenshots to determine a visual quality for each candidate screenshot of the multiple candidate screenshots; and generate the static screenshot using a candidate screenshot that exhibits a highest visual quality of the multiple candidate screenshots.

In some aspects, the techniques described herein relate to a computing device, wherein to capture the visual content as a dynamic screenshot includes to capture multiple candidate screenshots of the visual content including one or more candidate screenshots of one or more portions of the visual content presented on the one or more display devices prior to receipt of the indication to capture the screenshot.

In some aspects, the techniques described herein relate to a computing device, wherein to capture the visual content as a dynamic screenshot includes to: capture multiple candidate screenshots of the visual content; present a graphical user interface that includes the multiple candidate screenshots; receive a selection of a subset of candidate screenshots from the multiple candidate screenshots; and generate the dynamic screenshot using the subset of candidate screenshots.

In some aspects, the techniques described herein relate to a computing device, wherein the one or more modules are further implemented to: capture multiple candidate screenshots of the visual content; present a guidance query requesting whether to generate the static screenshot using an instance of a candidate screenshot of the multiple candidate screenshots or to generate the dynamic screenshot using multiple candidate screenshots; and generate one of the static screenshot or the dynamic screenshot based on a response to the guidance query.

In some aspects, the techniques described herein relate to a method, including: receiving an indication to capture a screenshot of content displayed on one or more display devices of a computing device; determining whether the content represents static visual content or dynamic visual content; capturing a screenshot of the content based on whether the content represents static visual content or dynamic visual content, including: capturing the content as a static screenshot in an event that the content represents static content; or capturing the content as a dynamic screenshot in an event that the content represents dynamic content.

In some aspects, the techniques described herein relate to a method, wherein the determining whether the visual content represents static visual content or dynamic visual content includes communicating a query to a functionality of the computing device and receiving a query response identifying whether the visual content represents static visual content or dynamic visual content.

In some aspects, the techniques described herein relate to a method, wherein the determining whether the visual content represents static visual content or dynamic visual content includes: capturing multiple candidate screenshots of the visual content; comparing the multiple candidate screenshots to determine whether the multiple candidate screenshots include duplicate visual content or varying visual content; determining that the visual content represents static visual content in an event that the multiple candidate screenshots include duplicate visual content; or determining that the visual content represents dynamic visual content in an event that the multiple candidate screenshots include varying visual content.

In some aspects, the techniques described herein relate to a method, wherein the capturing the content as a static screenshot includes: capturing multiple candidate screenshots of the visual content; comparing the multiple candidate screenshots to determine a visual quality for each candidate screenshot of the multiple candidate screenshots; and generating the static screenshot using a candidate screenshot that exhibits a highest visual quality of the multiple candidate screenshots.

In some aspects, the techniques described herein relate to a method, wherein the capturing the visual content as a dynamic screenshot includes capturing multiple candidate screenshots of the visual content including one or more candidate screenshots of the visual content presented on the one or more display devices prior to receipt of the indication to capture the screenshot.

In some aspects, the techniques described herein relate to a method, further including: capturing multiple candidate screenshots of the visual content; presenting a guidance query requesting whether to generate the static screenshot using an instance of a candidate screenshot of the multiple candidate screenshots or to generate the dynamic screenshot using multiple candidate screenshots; and generating one of the static screenshot or the dynamic screenshot based on a response to the guidance query.

In some aspects, the techniques described herein relate to a system including: one or more processors implemented at least partially in hardware; and one or more computer-readable storage media storing instructions that are executable by the one or more processors to: receive an indication to capture a screenshot of visual content displayed on one or more display devices of a computing device; capture multiple candidate screenshots of the visual content; compare the multiple candidate screenshots to determine whether the multiple candidate screenshot include duplicate visual content or varying visual content; generate a static screenshot of the visual content in an event that the multiple candidate screenshots include duplicate visual content; and generate a dynamic screenshot of the visual content in an event that the multiple candidate screenshots include varying visual content.

In some aspects, the techniques described herein relate to a system, wherein to capture the multiple candidate screenshots of the visual content includes to capture one or more of the candidate screenshots using one or portions of the visual content output one the one or more display devices prior to receipt of the indication to capture the screenshot of the visual content.

In some aspects, the techniques described herein relate to a system, wherein to capture the multiple candidate screenshots of the visual content includes to capture one or more of the candidate screenshots using one or portions of the visual content output one the one or more display devices during a predetermined time duration prior to receipt of the indication to capture the screenshot of the visual content.

In some aspects, the techniques described herein relate to a system, wherein the instructions that are further executable by the one or more processors to: capture multiple candidate screenshots of the visual content; present a guidance query requesting whether to generate the static screenshot using an instance of a candidate screenshot of the multiple candidate screenshots or to generate the dynamic screenshot using multiple candidate screenshots; and generate one of the static screenshot or the dynamic screenshot based on a response to the guidance query.

In some aspects, the techniques described herein relate to a system, wherein to generate the dynamic screenshot includes to: present a graphical user interface that includes the multiple candidate screenshots; receive a selection of a subset of candidate screenshots from the multiple candidate screenshots; and generate the dynamic screenshot using the subset of candidate screenshots.

The invention claimed is:

1. A computing device, comprising:
one or more display devices; and
one or more modules implemented at least in part in hardware of the computing device to:
receive an indication to capture a screenshot on the one or more display devices;
determine whether dynamic visual content is displayed on the one or more display devices;
capture video of the dynamic visual content;
communicate, in response to the capture of the video of the dynamic visual content, a query including a first option to generate a static screenshot of the dynamic visual content and a second option to generate a dynamic screenshot of the dynamic visual content;
present, in response to a selection of the first option, multiple candidate frames depicting the dynamic visual content and communicate a second query including the multiple candidate frames for selection of a frame for the static screenshot; and
present, in response to a selection of the second option, a third option to select a portion of video content depicting the dynamic visual content for the dynamic screenshot.

2. The computing device of claim 1, wherein the query comprises a guidance query and to capture the dynamic visual content in response to the selection of one or more of the first option or the second option comprises to:
present the guidance query requesting a user response to the first option and the second option;
generate, in response to the user response including the selection of the first option, the static screenshot; and
generate, in response to the user response including the selection of the second option, the dynamic screenshot.

3. The computing device of claim 2, wherein to generate one or more of the static screenshot or the dynamic screenshot comprises to:
present a graphical user interface that includes the multiple candidate frames;
receive a selection of one or more candidate frames from the multiple candidate frames; and
generate the static screenshot or the dynamic screenshot based on the selection of the one or more candidate frames.

4. The computing device of claim 1, wherein the query comprises a content query and to capture the dynamic visual content as one or more of the static screenshot or the dynamic screenshot comprises to:
communicate the content query to a functionality of the computing device; and
receive a content query response identifying a content type of the dynamic visual content.

5. The computing device of claim 4, wherein the functionality of the computing device comprises one or more of a display manager, an operating system, or an application.

6. The computing device of claim 1, further configured to present an editing experience to enable editing of the static screenshot or the dynamic screenshot.

7. The computing device of claim 6, wherein the editing experience to enable editing of the static screenshot comprises to edit visual attributes of the static screenshot, and the editing experience to enable editing of the dynamic screenshot comprises to edit a playback length of the dynamic screenshot.

8. The computing device of claim 1, wherein the query includes an option to select a playback length of the dynamic screenshot.

9. The computing device of claim 1, wherein the portion of the video content depicting the dynamic visual content for the dynamic screenshot includes a buffer of video captured before the indication to capture the screenshot is received.

10. A method, comprising:
receiving an indication to capture a screenshot on one or more display devices of a computing device;
determining whether dynamic visual content is displayed on the one or more display devices;
capturing video of the dynamic visual content;
communicating, in response to capturing the video of the dynamic visual content, a query including a first option to generate a static screenshot of the dynamic visual content and a second option to generate a dynamic screenshot of the dynamic visual content;
presenting, in response to a selection of the first option, multiple candidate frames depicting the dynamic visual content and communicating a second query including the multiple candidate frames for selection of a frame for the static screenshot; and presenting, in response to a selection of the second option, a third option to select a portion of video content depicting the dynamic visual content for the dynamic screenshot.

11. The method of claim 10, wherein the query comprises a guidance query and to capture the dynamic visual content in response to the selection of one or more of the first option or the second option comprises:

presenting the guidance query requesting a user response to the first option and the second option;

generating, in response to the user response including the selection of the first option, the static screenshot; and generating, in response to the user response including the selection of the second option, the dynamic screenshot.

12. The method of claim 11, further comprising:

presenting a graphical user interface that includes the multiple candidate frames;

receiving a selection of one or more of the multiple candidate frames; and generating the static screenshot or the dynamic screenshot based on the selection of the first option or the second option.

13. The method of claim 10, further comprising:

communicating a content query to a functionality of the computing device; and receiving a content query response identifying a content type of the dynamic visual content.

14. The method of claim 13, wherein the functionality of the computing device comprises one or more of a display manager, an operating system, or an application.

15. The method of claim 10, further comprising presenting an editing experience to enable editing of the static screenshot or the dynamic screenshot.

16. A mobile device, comprising:

at least one memory; and at least one processor coupled to the at least one memory and configured to cause the mobile device to:

receive an indication to capture a screenshot on one or more display devices of a computing device;

determine whether dynamic visual content is displayed on the one or more display devices;

capture video of the dynamic visual content;

communicate, in response to the capture of the video of the dynamic visual content, a query including a first option to generate a static screenshot of the dynamic visual content and a second option to generate a dynamic screenshot of the dynamic visual content;

present, in response to a selection of the first option, multiple candidate frames depicting the dynamic visual content and communicate a second query including the multiple candidate frames for selection of a frame for the static screenshot; and present, in response to a selection of the second option, a third option to select a portion of video content depicting the dynamic visual content for the dynamic screenshot.

17. The mobile device of claim 16, wherein the query comprises a guidance query and to capture the dynamic visual content in response to the selection of one or more of the first option or the second option, the at least one processor is configured to cause the mobile device to:

present the guidance query requesting a user response to one or more of the first option or the second option;

generate, in response to the user response including the selection of the first option, the static screenshot; and generate, in response to the user response including the selection of the second option, the dynamic screenshot.

18. The mobile device of claim 17, wherein to generate one or more of the static screenshot or the dynamic screenshot, the at least one processor is configured to cause the mobile device to:

present a graphical user interface that includes the multiple candidate frames;

receive a selection of one or more candidate screenshots from the multiple candidate frames; and generate the static screenshot or the dynamic screenshot based on the selection of the one or more candidate screenshots.

19. The mobile device of claim 18, wherein the at least one processor is configured to cause the mobile device to:

communicate a content query to a functionality of the computing device; and receive a content query response identifying a content type of the dynamic visual content.

20. The mobile device of claim 16, wherein the at least one processor is configured to cause the mobile device to present an editing experience to enable editing of the static screenshot or the dynamic screenshot.

* * * * *